March 2, 1926. Re. 16,281

L. L. LUCE ET AL

INTERNAL COMBUSTION ENGINE

Original Filed Oct. 1, 1921 2 Sheets-Sheet 1

INVENTOR.
L. L. Luce.
L. Mattson.
BY
Dewey, Strong, Townsend & Lofton
ATTORNEYS.

March 2, 1926.

Re. 16,281

L. L. LUCE ET AL

INTERNAL COMBUSTION ENGINE

Original Filed Oct. 1. 1921 2 Sheets-Sheet 2

INVENTOR.
L. L. Luce.
L. Mattson.
BY
Denny, Strong, Jouneaud & Lyttus
ATTORNEYS.

Reissued Mar. 2, 1926. Re. 16,281

UNITED STATES PATENT OFFICE.

LOUIS L. LUCE AND LEROY MATTSON, OF OAKLAND, CALIFORNIA, ASSIGNORS TO LUCE-MATTSON ENGINE COMPANY, OF SAN FRANCISCO, CALIFORNIA, A CORPORATION OF CALIFORNIA.

INTERNAL-COMBUSTION ENGINE.

Original No. 1,482,519, dated February 5, 1924, Serial No. 504,546, filed October 1, 1921. Application for reissue filed December 7, 1925. Serial No. 73,897.

*To all whom it may concern:*

Be it known that we, LOUIS L. LUCE and LEROY MATTSON, citizens of the United States, residing at Oakland, in the county of Alameda, State of California, have invented a new and useful Internal-Combustion Engine, of which the following is a specification.

This invention relates to an internal combustion engine and is designed more especially as an improvement upon the structure shown in Patent No. 1,390,572 issued to us on Sept. 13, 1921.

It is an object of this invention to reduce the length of the patented motor as well as the pistons operating therein and to provide the upper portion of each cylinder with an integral wall projecting between the firing and the charging pistons so as to prevent them from contacting with each other during the operation of the engine.

A still further object is to materially reduce friction by keeping the pistons out of contact with each other.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

Figure 1:
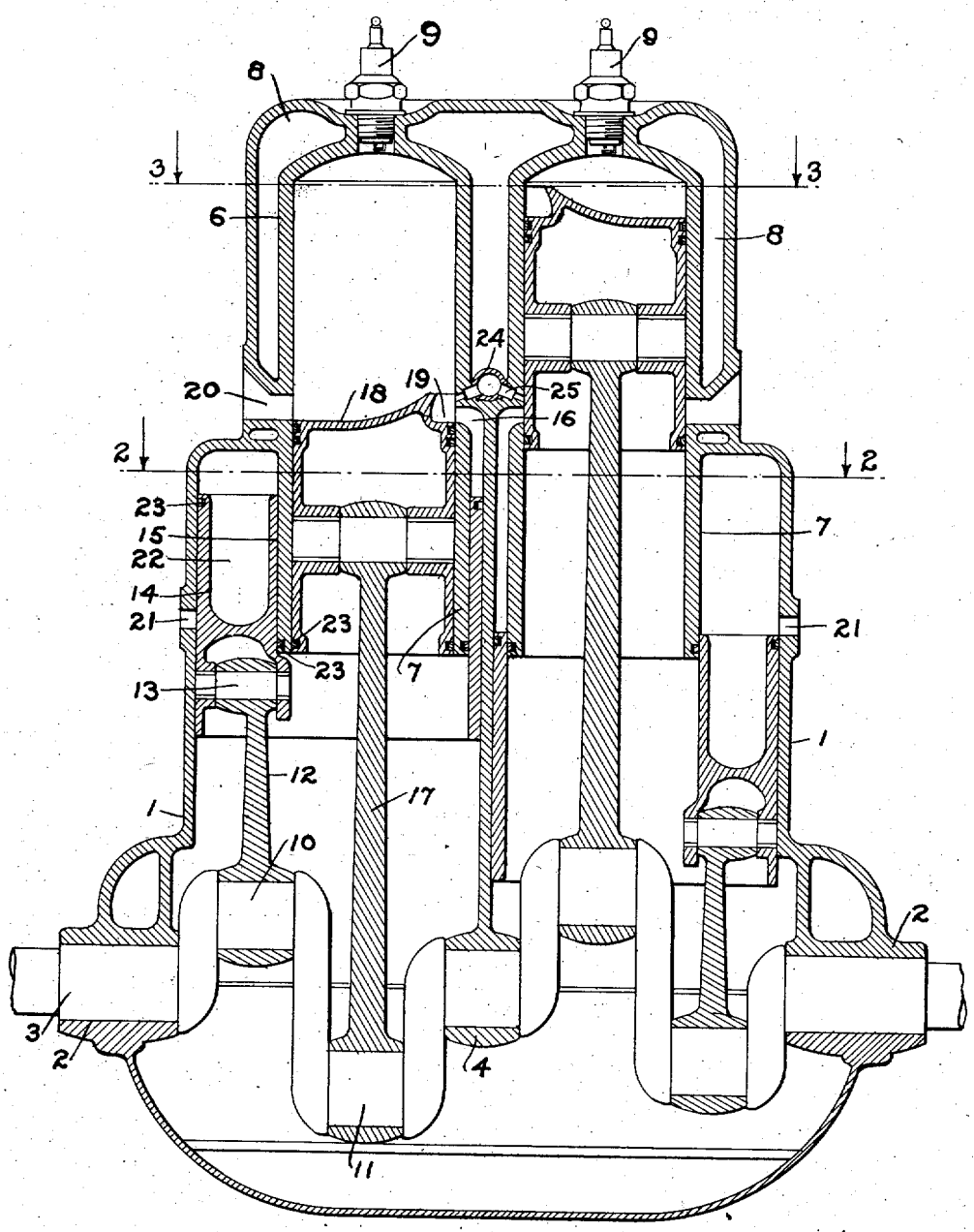
Figure 1 is a vertical section through the engine.

Referring to the figures by characters of reference 1 designates the casing of the engine, the same being provided with bearings 2 in which is journaled a shaft 3. An intermediate portion of the shaft is journaled in a bearing 4 carried by a partition formed at the center of the casing, it being understood, as will be apparent by referring to Figure 2, that the casing 1 is made up of two substantially cylindrical portions formed integral with each other as shown or suitably joined so as to provide the partition 5 in which the bearing 4 is formed.

Figure 2:
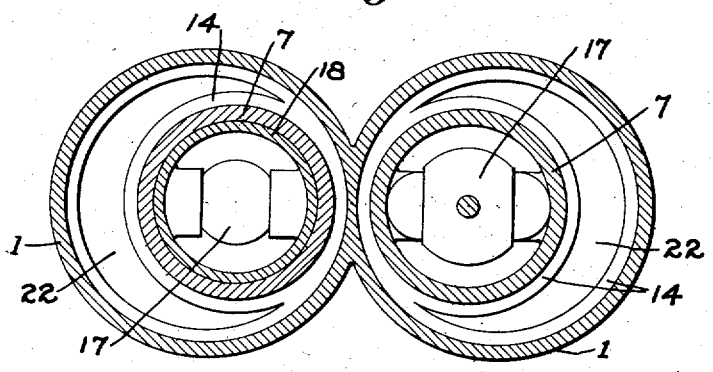
Figure 2 is a section on line 2—2, Figure 1.
Figure 3:
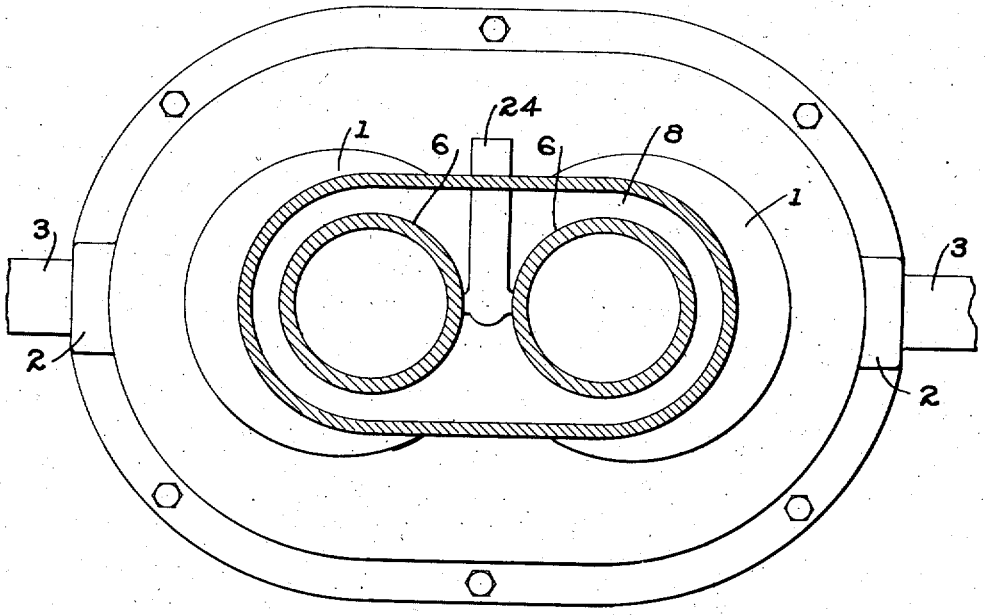
Figure 3 is a section on line 3—3, Figure 1.

Extending upwardly from the casing are spaced cylinders 6 the diameters of which are considerably less than the diameters of the cylindrical portions of the casing 1. These cylinders are formed integral with the casing and have their inner portions extending into the respective cylindrical portions of the casing as shown at 7, these inwardly extending portions being eccentrically located within the cylindrical portions of the casing 1 as shown in Figure 2. They do not, however, contact with the walls of the casing. Those portions of the cylinders projecting beyond the casing 1 are provided with a water jacket 8 and suitably mounted within each of the cylinders, preferably at the outer end thereof, is a spark plug 9.

The shaft 3 is provided with two pairs of cranks indicated at 10 and 11. On the crank 10 is mounted a pitman 12 which is pivotally connected, as at 13, to a charging piston 14 having an eccentrically arranged opening 15 therein into which projects one of the extensions 7. This opening is necessarily eccentrically disposed in order to receive the portion 7 which thus serves to guide the piston during its reciprocation within the casing 1. By constructing the charging piston as described it becomes necessary to use but one pitman 12 for each charging piston. The space between the guide portion 7 and the wall of the casing 1 and within which the piston 14 works is closed at its outer end except for a port 16 which opens into the cylinder 6 from which said guide portion 7 extends, the ports 16 of the two cylinders being disposed at opposite sides of the partition 5 as shown clearly in Figure 1.

The crank 11 is engaged by a pitman 17 extending into and pivotally attached to a firing piston 18 adapted to work within the guide extension 7 and within the cylinder 6. The head of this piston is provided at its periphery with a recess 19 adapted to register with the port 16 during the completion of each stroke of the piston away from its spark plug 9. This head is preferably curved upwardly and laterally away from the recess portion 19 so that when said recess is registering with the port 16 the head has moved past and has exposed an exhaust port 20 formed in the cylinder 6 diametrically opposite the port 16.

A fuel intake port 21 opens into each of the cylindrical portions of the casing 1, each port being in communication with the widest portion of the space between the guide portion 7 and the wall of the casing 1 and being located where it will only be exposed or opened when the piston 14 reaches the limit of its suction stroke. It will be noted that each piston 14 has a crescent shaped recess or pocket 22 in its active face.

For the purpose of preventing leakage between the working parts suitable packing rings 23 can be extended around the pistons 14, the inner ends of the guide portions 7, and the end portions of each of the pistons 18.

As a means for scavenging the engine there is provided between the cylinders 6 a pipe 24 having nozzles 25 extending therefrom for directing steam jets into the cylinder 6 directly above and close to the ports 16.

During the operation of the engine each piston 14 moves downwardly so as to uncover its intake port 21 and the partial vacuum produced by this action will result in fuel rushing into the path of the piston so that on the return stroke of said piston it will compress the charge. The compressed fuel will be directed into one of the cylinders 6 as soon as recess 19 comes into register with the port 16 and as soon as this fuel has been directed into cylinder 6 piston 18 will compress the fuel by moving towards the spark plug 9. Ignition of the charge will then take place in the usual manner and the piston 18 will be driven away from the closed head of the cylinder so as to expose the exhaust port 20. Just prior to the opening of the port 16 the recess 19 will expose one of the nozzles 25 so that a jet of steam under pressure will be directed upward into the cylinder and toward the exhaust port, thereby scavenging the cylinder and eliminating carbon. The steam can be supplied to the nozzles 25 from any source desired.

Importance is attached to the fact that the cylinders 6 are eccentrically disposed relative to the cylindrical portions of the casing 1 because it is thus possible to reduce the number of connections between the pistons and the crank shaft. Furthermore by utilizing the guide portions 7 the engine can be made shorter and more compact than heretofore and as the pistons are thereby kept out of contact with each other the friction is materially reduced and the engine rendered more efficient in operation.

Having thus described our invention, what we claim is:

1. In an internal combustion engine, the combination with a casing having cylindrical portions, of spaced cylinders rigid with the casing and having guide portions constituting extensions thereof and eccentrically mounted within the cylindrical portions of the casing, charging pistons mounted for reciprocation between said guide portions and the walls of the cylindrical portions of the casing, a firing piston mounted for reciprocation within each cylinder and its extension, a port for directing fuel from each charging cylinder into each firing cylinder, a fuel supply port adapted to be opened and closed by each of the charging pistons, an exhaust port in each firing cylinder, said firing pistons constituting means for opening and closing the exhaust ports and the ports connecting the charging and firing cylinders.

2. In an internal combustion engine a casing having cylindrical portions, cylinders extending from the casing, guide extensions upon the cylinders and eccentrically disposed within the respective cylindrical portions of the casing, a firing piston mounted for reciprocation in each cylinder and its guide extension, and a charging piston mounted for reciprocation between each guide extension and the wall of the cylindrical portion of the casing, a crank shaft, and connections between the crank shaft and the charging and firing pistons for operating each charging piston in a direction opposite to its firing piston.

3. In an internal combustion engine the combination with a casing having cylindrical portions, of cylinders, a guide extension upon each cylinder eccentrically mounted within one of the cylindrical portions of the casing, a firing piston mounted for reciprocation within each cylinder and its extension, a charging piston mounted for reciprocation between each guide extension and the cylindrical portion of the casing in which it is located, means for moving each firing piston and its charging piston in opposite directions respectively, each charging piston cooperating with its casing for compressing fuel in the path thereof, a port for conducting fuel from the path of each charging piston to one of the cylinders, an exhaust port communicating with each cylinder, a scavenging port opening into each cylinder, each firing piston constituting means for controlling the opening and closing of the ports in properly timed relation.

4. In an internal combustion engine a casing having a cylindrical portion, a charging piston mounted for reciprocation therein and having an eccentric opening therethrough, a cylinder, a guide extension thereon projecting into the opening in the charging piston, a firing piston mounted for reciprocation within the cylinder and its extension, and a port for conducting fuel from the path of the charging piston to the path to the firing piston.

5. In an internal combustion engine a casing comprising cylindrical portions, a crank shaft, charging pistons mounted for reciprocation within the respective cylindrical portions and each having an eccentrically arranged opening therein, there being a recess within the active face of each piston, pitman connections between the crank shaft and the charging pistons, each connection being located where the distance is greatest between the periphery of the piston and the opening therein.

6. In an internal combustion engine the combination with a casing having cylindrical portions, of charging pistons mounted for reciprocation within said portions, a tubular guide arranged eccentrically within each charging piston, a firing piston mounted for reciprocation within each guide, and cylinders constituting continuations of the guides.

7. In an internal combustion engine, the combination of a crank case and a cylinder casing extending outwardly therefrom, and having charging cylinders therein, a crank shaft, charging pistons mounted for reciprocation within the cylinders and each having an eccentrically arranged opening therein, cylindrical walls providing firing cylinders extending into the said openings, firing pistons mounted for reciprocation in the firing cylinders, and pitman connections between the crank shaft and pistons.

8. In an internal combustion engine, the combination of a crank case and a cylinder casing extending outwardly therefrom, stationary cylindrical walls within the casing providing a charging cylinder near the crank case and a smaller firing cylinder further removed from the crank case, the firing cylinder wall having a portion thereof extending into the charging cylinder in a manner providing a separating wall between the firing and charging cylinders, a charging piston in the charging cylinder between the charging cylinder wall and the said extension of the firing cylinder wall, the charging piston having an opening for receiving the said extension thereinto, a firing piston in the firing cylinder, a fuel supply port through the cylinder casing adapted to be opened and closed by the charging piston, a port connecting the charging and firing cylinders, an exhaust port from the firing cylinder, the last two ports being adapted to be opened and closed by the firing piston, a crank shaft, a pitman connection from the shaft to the charging piston, and a pitman connection from the shaft to the firing piston, the arrangement being such that in operation a charge of gas is received through the intake port into the charging cylinder, compressed by the charging piston and forced through the said connecting port into the firing cylinder and outwardly through the exhaust port after the explosion thereof.

9. In an internal combustion engine, the combination of a crank case and a cylinder casing extending outwardly therefrom, cylindrical walls carried by and within the casing and providing charging cylinders and smaller firing cylinders, the firing cylinders being further removed from the crank case than the charging cylinders, and each firing cylinder wall having a portion thereof extending into the adjacent charging cylinder in a manner providing a separating wall between the cooperating charging and firing cylinders, a charging piston in each charging cylinder between the charging cylinder wall and the said extension of the firing cylinder wall, each charging piston having an opening for receiving the said extension therein, a firing piston in each firing cylinder, fuel supply ports through the cylinder casing adapted to be opened and closed by the charging pistons, ports connecting the charging and firing cylinders, exhaust ports from the firing cylinders, the last two mentioned ports being adapted to be opened and closed by the firing pistons, a crank shaft, pitman connection from the shaft to the charging pistons, and pitman connections to the shaft from the firing pistons, the arrangement being such that in operation charges of gas are received through the intake ports into the charging cylinders, compressed by the charging pistons and forced through the said connecting ports into the firing cylinders and outwardly through the exhaust ports after the explosion thereof.

In testimony whereof, we have hereunto signed our names.

LOUIS L. LUCE.
LEROY MATTSON.